United States Patent
Kaidalov et al.

(10) Patent No.: US 9,127,772 B2
(45) Date of Patent: Sep. 8, 2015

(54) ROTARY KILN END SEALING ASSEMBLY

(75) Inventors: Aleksandr Kaidalov, Ida-Virumaa (EE);
Boriss Kindorkin, Ida-Virumaa (EE);
Aleksandr Tihhonov, Ida-Virumaa (EE)

(73) Assignee: EESTI ENERGIA OLITOOSTUS AS, Ida-Virumaa (EE)

( * ) Notice: Subject to any disclaimer, the term of this patent is extended or adjusted under 35 U.S.C. 154(b) by 369 days.

(21) Appl. No.: 13/515,171

(22) PCT Filed: Dec. 10, 2010

(86) PCT No.: PCT/EP2010/069400
§ 371 (c)(1),
(2), (4) Date: Jul. 19, 2012

(87) PCT Pub. No.: WO2011/070162
PCT Pub. Date: Jun. 16, 2011

(65) Prior Publication Data
US 2012/0288811 A1    Nov. 15, 2012

(30) Foreign Application Priority Data
Dec. 11, 2009   (EE) ................ 200900123 U

(51) Int. Cl.
*F27B 7/24*      (2006.01)
*F16J 15/34*    (2006.01)
(Continued)

(52) U.S. Cl.
CPC ........... *F16J 15/342* (2013.01); *F16J 15/3452* (2013.01); *F16L 23/032* (2013.01); *F27B 7/24* (2013.01); *F27D 99/0073* (2013.01)

(58) Field of Classification Search
CPC ........ F27B 7/24; F16J 15/342; F16J 15/3452; F16C 33/763; F16L 23/032

USPC ........... 432/115; 277/903, 358, 390, 391, 590
See application file for complete search history.

(56) References Cited

U.S. PATENT DOCUMENTS 2,247,505 A  *  7/1941  Kohler .......................... 277/400
3,917,289 A  *  11/1975  Ivanov et al. .................. 277/400
(Continued)

FOREIGN PATENT DOCUMENTS

DE     19836901 A1  *  2/2000  ................ F04B 1/04
JP     62237172 A   *  10/1987 ................ F16J 15/34

OTHER PUBLICATIONS

Namco, "CD ROM General Catalog", Namco, pp. 118-120.*
(Continued)

*Primary Examiner* — Steven B McAllister
*Assistant Examiner* — Steven Anderson, II
(74) *Attorney, Agent, or Firm* — Birch, Stewart, Kolasch & Birch, LLP

(57) ABSTRACT

The present invention belongs to the field of retorting apparatus used in the field of oil shale processing, in particular the invention relates to the end sealing assembly of the rotary kiln and the improvements of the end sealing (16); whereas the first and second casing ring (2, 3) used in the end sealing compose of at least four segment, and onto both sides of the rotating casing ring (1) a rectangulary cut hollow (81, 91) for lubricants has been formed; and on the side that is assembled with the rotating casing ring of the first and second casing ring (2, 3), accordingly, a hollow (82, 93) has been formed for lubricants, which in the making face the corresponding hollow (81, 91) of the casing ring, forming lubricant channels (8, 9) between the casing ring (1) of the end sealing assembly and the first and second casing ring (2, 3).

11 Claims, 8 Drawing Sheets

(51) Int. Cl.
*F16L 23/032* (2006.01)
*F27D 99/00* (2010.01)

(56) References Cited

U.S. PATENT DOCUMENTS 3,923,450 A * 12/1975 Inoue et al. .................. 432/115
3,980,357 A * 9/1976 Bellati et al. ................. 384/398
4,299,536 A * 11/1981 Sieghartner et al. ......... 415/55.6
4,545,764 A * 10/1985 Gillies et al. ................. 432/115
5,106,105 A * 4/1992 Drexler ......................... 277/369
5,571,269 A * 11/1996 Buelow ......................... 277/545
5,873,697 A * 2/1999 Gully ........................... 415/172.1
6,589,049 B1 * 7/2003 Sutton et al. .................. 432/115
7,686,612 B1 * 3/2010 Buteau ......................... 432/115
2007/0296156 A1 * 12/2007 Yanagisawa et al. ......... 277/352

OTHER PUBLICATIONS

International Search Report, dated Mar. 28, 2011, issued in PCT/EP2010/069400.
Written Opinion of the International Searching Authority, dated Mar. 28, 2011, issued in PCT/EP2010/069400.

* cited by examiner

ROTARY KILN END SEALING ASSEMBLY

TECHNICAL FIELD

The present invention belongs to the field of the retorting apparatus used in the field of oil shale processing, in particular the invention relates to end sealing assemblies of the rotary kiln and the improvements of its end sealing.

BACKGROUND ART

In the rotary kiln, which is part of a solid heat carrier process, the thermal decomposition of the organic mass of fuel takes place. In the rotary kiln, dry oil shale is mixed with the hot heat carrier and it remains in the rotary kiln for a certain period until heat exchange occurs between the oil shale and the heat carrier, resulting in the pyrolysis of oil shale. At high temperature and at over pressure pyrolysis of oil shale results in formation of gaseous and solid products, which are further processed in subsequent processing steps.

To improve the efficiency of the pyrolysis process, for better mixing of the oil shale and ash, but also to ensure the forward movement of the material from the input end to the output end of the rotary kiln, the rotary kiln is constantly rotating.

The rotary kiln is a drum with internally refractory lined parallel walls that rotates on four carrying rollers. There are openings at both ends of the rotary kiln for feeding the material to be processed (oil shale and ash) and releasing the semicoke and gaseous products.

Attaching the rotating input/output ends 17' with fixed units or elements of adjacent units is performed with the use of special end sealing assemblies and end sealings (see FIG. 1).

The mentioned end sealings compensate for the radial movement of the ends and the longitudinal increase due to the temperature changes of the rotary reactor.

End sealings of the rotary kiln have the following purposes:
Sealing the terminal joints between the pressurized rotary kiln and fixed units while rotating and avoiding the vapour-gas mixture from leaking to the surrounding atmosphere via terminal joints which are between the rotating drum and mixing chamber and the rotating drum and separator of solid particles from vapour-gas mixture or dust chamber;
Lubricating the working surfaces of end sealings;
Cooling the construction of end sealings;
Compensating for the longitudinal expansion and radial movement due to the temperature changes of the reactor.

The constructions of input end sealing and output end sealing of the existing rotary kiln are different with respect to the sizes of cast iron casing rings 2' and 3' (see FIG. 1). The cast iron casing rings used in said sealings have different diameters in the known construction. In addition, the casing rings have a different thickness and the lubricant channels have a rectangular cut in the known solution. In the technical solution in use, connecting the casing ring 1' coaxially with cast iron casing rings forms lubricant channels 8' and 9' in which the lubricant is meant for lubricating the working surfaces and also cooling the construction of the pair of the working rings. FIG. 1 depicts the technical solution of the end sealings of the existing rotary kiln in which a casing ring 1' is attached to the flange 12', which is attached to the outside of the rotating drum 15' of the rotary kiln, and the first casing ring 2' is attached to the flange 10', which is attached to the outside of the fixed input/output unit 17', and using appropriate attachment means, the second casing ring 3' is attached to the other side of the rotating casing ring 1'. For the sake of clarity, in the figures describing the present invention, same position numbers with an apostrophe added are used with the same construction elements.

Considering the fact that during the working process of the rotary kiln, there is over pressure in the whole rotating drum of the solid heat carrier retorting unit, thus, in terms of environmental safety, it is especially important that the joints of the rotary kiln and those of the fixed units that are connected to it ensure a sufficient thickness, so that the gases with different chemical composition produced during the retorting process would not leak into the surrounding environment.

DISCLOSURE OF INVENTION

The aim of the present invention is simplifying the existing technical solution and eliminating the following defects of its construction:
The depth of cast iron and steel end sealings of the rotating drum of the rotary kiln is insufficient, due to which their working age is low and which in turn decreases the physical life of the whole device;
Casing rings have an excessive degree of wear and tear, lack of control over the consumption and temperature of lubricant, which could be a lubricating-sealing-cooling liquid;
Complicated manufacturing (casting and mechanical processing-turning) and transportation of cast iron casing rings, difference in the diameter of cast iron rings, large sizes;
Replacement of end sealings is time consuming and difficult due to the large size of the rings;
Increased wearing and overheating of the working ring pairs, insufficient overlapping of lubricant channels profile and one-sided feeding of the lubricant.

The aims of the present invention are achieved by changing the construction of the casing rings of end sealings, whereas the measurements of the casing rings are unified, i.e. they are formed with the same diameter, i.e. the casing rings of end sealings of the input end and output end are designed with the same diameter, making the production of them more automated and easier and, therefore, also cheaper. The cast iron sealing rings are produced and formed out of at least four independent segments. At the same time, this enables to increase the thickness of the cast iron casing rings and, in respect to that, also the depth of the channels that are meant for the lubricant in the cast iron casing rings. Said channels have a trapezoid cut instead of a rectangular one. The possibility of controlling the consumption and temperature of the lubricating-sealing-cooling liquid or lubricant is added. In addition, the number and position of adding points of the lubricating-sealing-cooling liquid or lubricant is changed.

BRIEF DESCRIPTION OF DRAWINGS

In the following, the present invention is described in more detail with reference to the added figures, where.

BEST MODE FOR CARRYING OUT THE INVENTION

Figure 1:
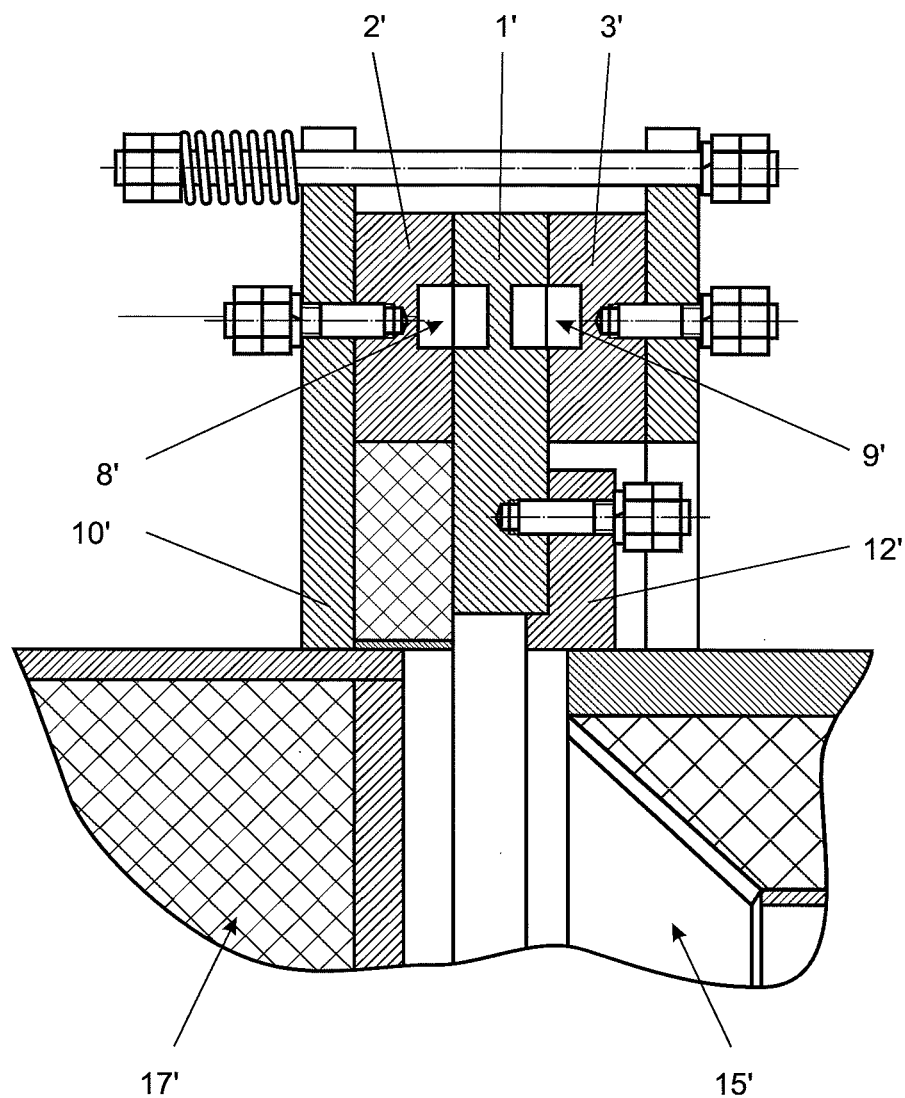
FIG. 1 shows the construction of the end sealing known in the art that is used to connect the rotating drum and fixed input/output units of the rotary kiln.
Figure 2:
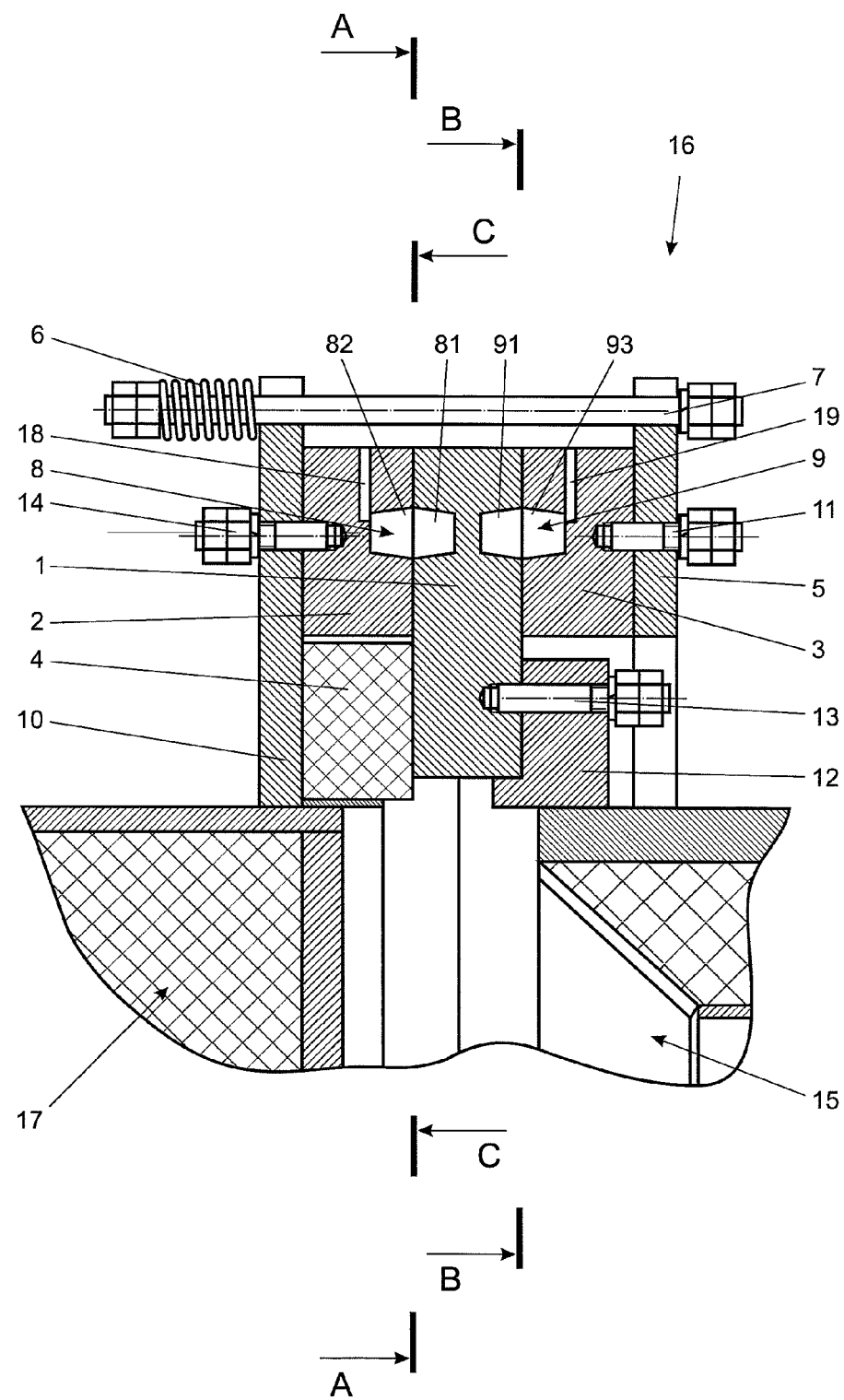
FIG. 2 shows the construction of the end sealing assembly according to the present invention.

FIG. 2 depicts the connect node of the rotary 15 of the rotary kiln with input/output ends 17, for which there is, for example, an oil shale mixing chamber in the input end of the rotary kiln and a dust chamber in the output end of the rotary kiln.

The end sealing assembly of the rotary kiln includes an end sealing 16, which comprises a flange 10 attached to the fixed unit, a first casing ring 2, a rotating casing ring 1, a second casing ring 3, a flange 12 attached to the rotating drum 15 and a fixed flange 5 that is connected to the flange 10, which is attached to the fixed input/output unit 17 with fixing devices that include a fixing bolt 7, fixing nuts and a spring 6 to press the casing rings 2, 3 of the end sealing assembly against the rotating casing ring 1. While making the end sealing, lubricant channels 8, 9 are formed between the first casing ring 2 and rotating casing ring 1 and between the second casing ring 3 and rotating casing ring 1.

Figure 3:
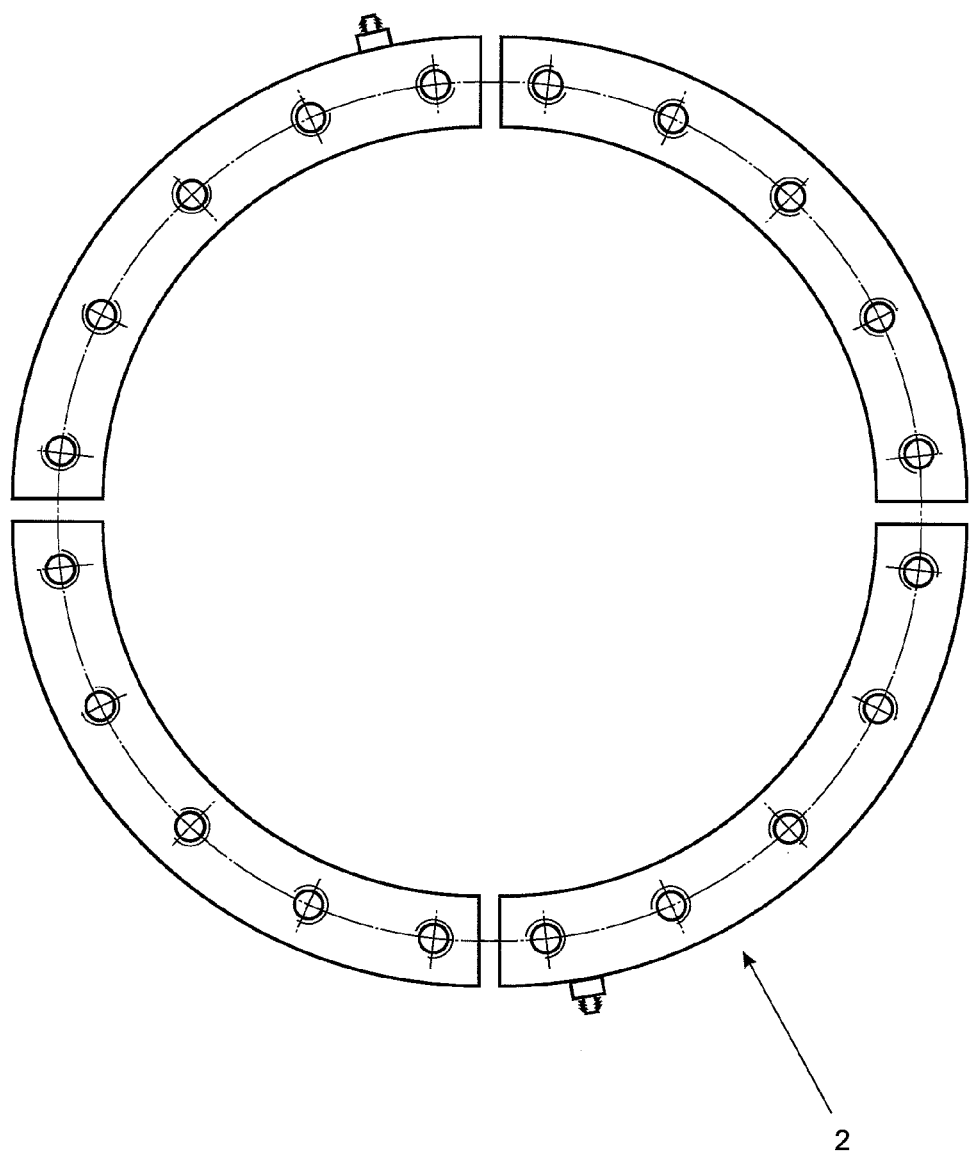
FIG. 3 shows a first (second) fixed casing ring made out of four segments from the side of fixing devices whereas segments are separated according to the present invention.

Both ends of the rotating drum of the rotary kiln have a flange 12 welded to it, in which there are openings for fixing devices 13 (for example stud bolts), which are used to fix the casing ring 1 to the flange 12. There are tapped holes drilled into the casing ring 1, into which fixing devices 13 are fixed to attach the casing ring 1 to the flange 12 of the rotating drum of the rotary kiln. Flange 12 has a break designed onto the side of the rotating casing ring 1 to support the casing ring while making the sealing assembly. With such attachment, the casing ring 1 rotates with the drum 15. Casing ring 1 is formed, for example, from ordinary steel. Grooves or hollows 81, 91 for the lubricant (lubricating-sealing-cooling liquid) are made onto both sides of the casing ring 1, whereas the grooves have been designed with a trapezoidal cut to ensure better compatibility in the casing rings 2 and 3 with according grooves or hollows 82, 93 when making the nod, so that lubricant channels 8, 9 would form between the casing rings in the end sealing assemblies. The casing rings 2, 3 are formed out of at least four segments, which during completion form a uniform casing ring (see FIG. 3). The depth Dk of the hollows made into the casing rings 2, 3 is 0.15 to 0.6 of the thickness T of the casing ring.

The fixed input/output unit 17, for example the input end of the dust chamber, which is attached to the rotary kiln, is attached with a flange 10, in which there are also openings for fixing devices 14. The first casing ring 2 is attached to the flange 10 with, for example, stud bolts. During forming the fixed flange 5, onto which previously the second casing ring 3 is attached with fixing devices 11, for example with stud bolts, is connected with the flange 10 with fixing devices, for example, stud bolts. During formation the first casing ring is left on the one side of the rotating casing ring 1 and the second casing ring 3 left on the other side of the rotating casing ring, so that the work surfaces on both sides of the rotating casing ring 1 slide along the work surfaces of the fixed casing rings 2, 3 when they rotate. During formation the hollows 82, 81, 91, 93 with a trapezoidal cut, which are made into the fixed casing rings 2, 3 and rotating casing rings, are placed over one another so that closed lubricant channels 8 and 9 are formed.

Figure 4:
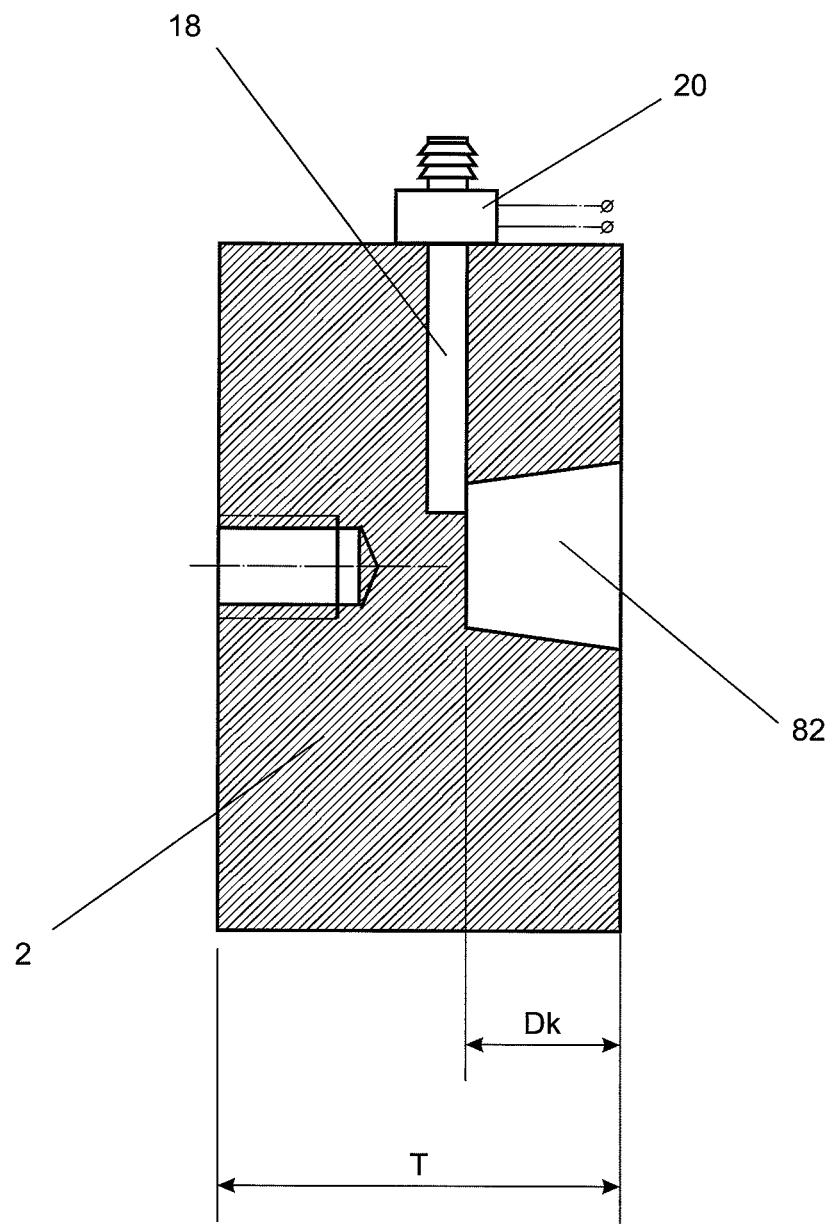
FIG. 4 shows the cut of the casing ring in which the construction of the lubricant channel is illustrated according to the present invention.
Figure 5:
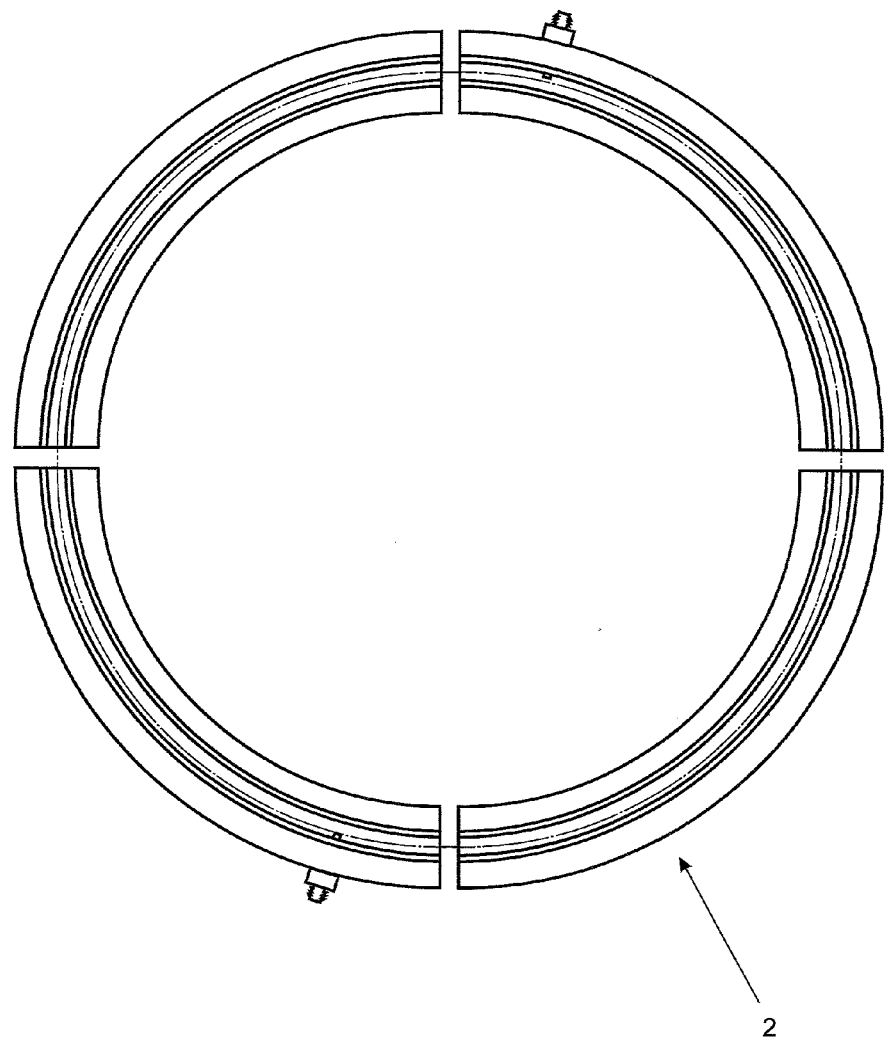
FIG. 5 shows a first (second) fixed casing ring made out of four segment from the side of hollow whereas segments are separated, according to the present invention.
Figure 6:
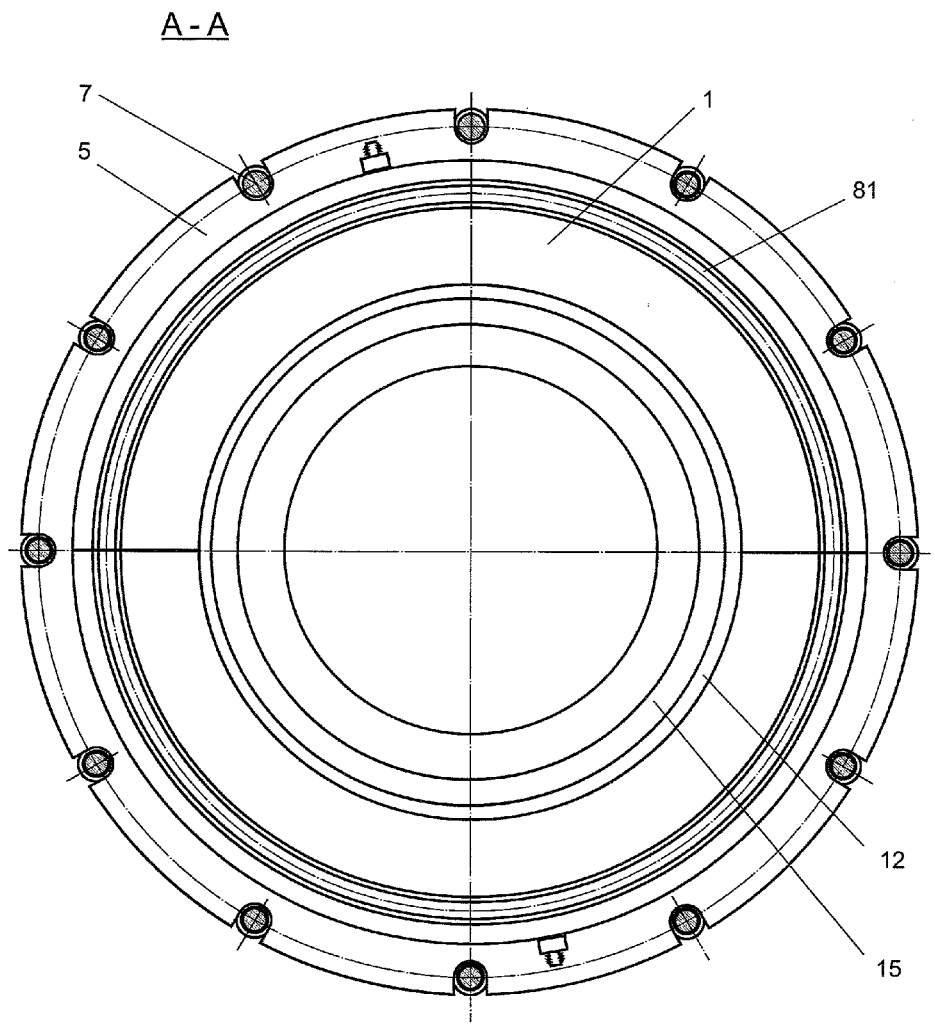
FIG. 6 shows a cut along the line A-A in FIG. 2 where a rotating casing ring has been made out of two segments, according to the present invention.
Figure 7:
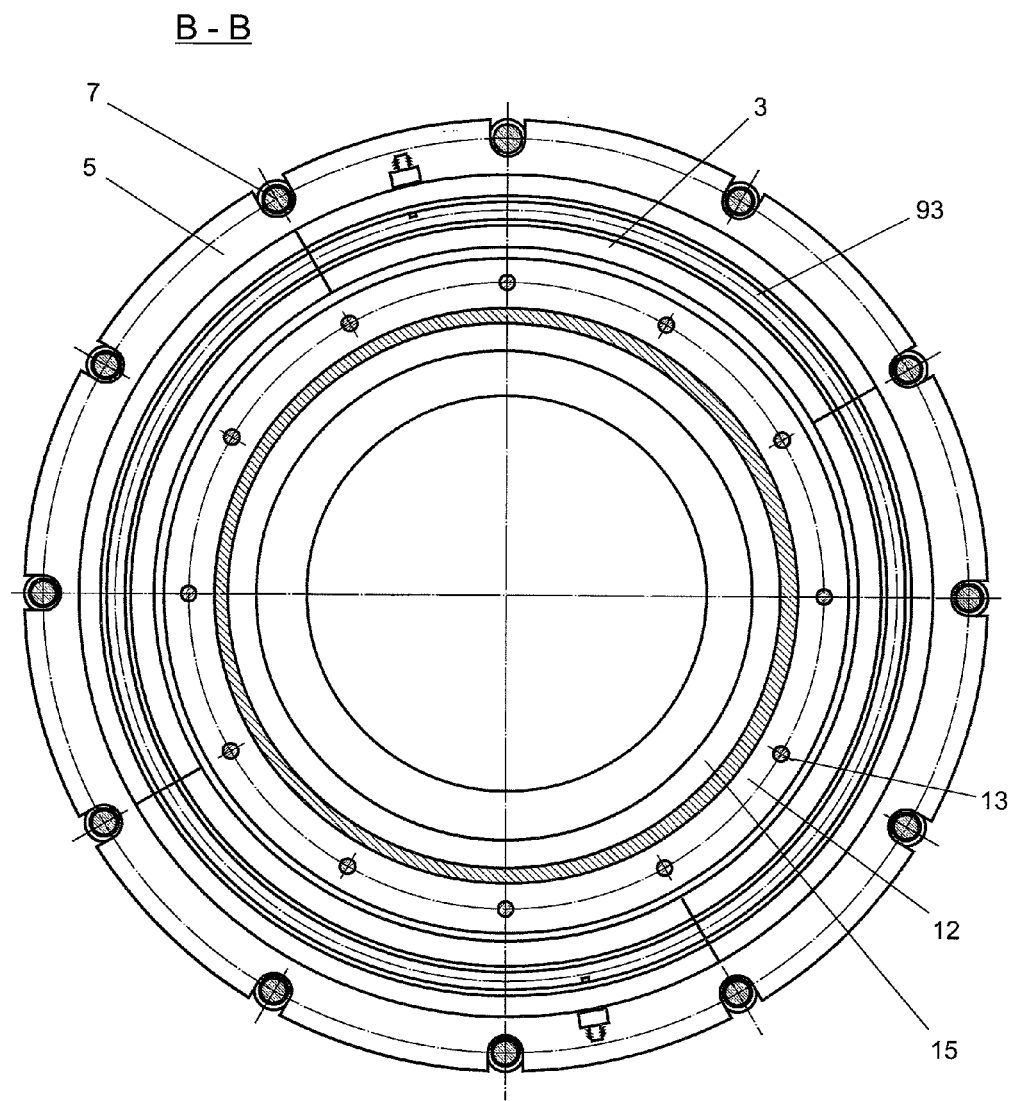
FIG. 7 shows a cut along the line B-B in FIG. 2 where a second casing ring has been made out of four segments, according to the present invention.
Figure 8:
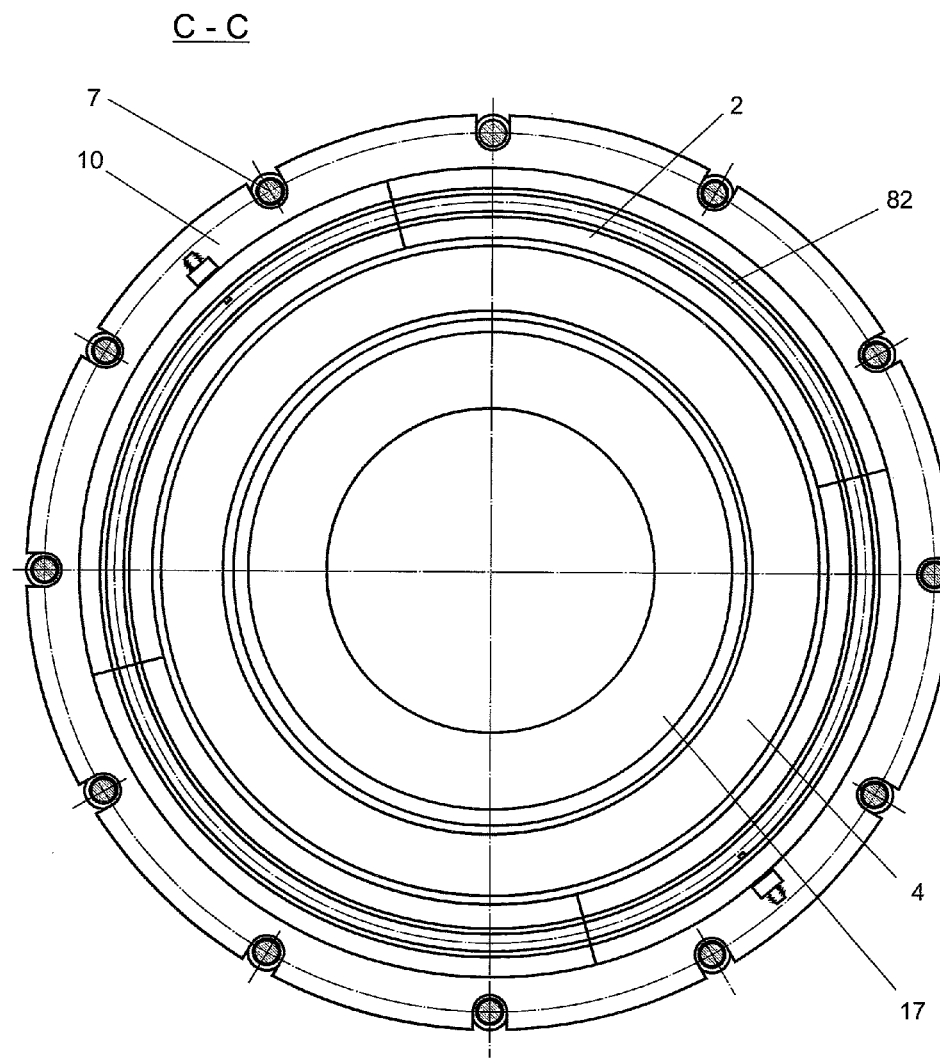
FIG. 8 shows cut along the line C-C in FIG. 2 where a first casing ring has been made out of four segments, according to the present invention.

When the rotary kiln works, working surfaces of the fixed casing ring 1 slide along the work surfaces of casing rings 2, 3 and the said working surfaces are lubricated with the lubricant in a lubricant channels 8, 9 to avoid their wear. In order to add lubricant into the lubricant channels 8, 9 during the whole working cycle of the rotary kiln, filling channels 18, 19 are drilled into the casing rings 2, 3. Lubricant is added through these channels as appropriate. Sensors 20 for measuring the temperature and amount of the lubricant are added onto the end of the filling channels to control the quantity and temperature of the lubricant (see FIG. 4). Temperature and quantity sensors widely used in the art can be used as the said sensors.

The formation of the end sealing assembly of the rotary kiln if performed as follows. Onto the outside of the end of the rotary reactor drum a flange 12 and onto the outside of the fixed input/output end a flange 10 have been welded previously. Sealing 4 is mounted onto the end of the fixed unit and the first casing ring 2 is made out of the segments that are attached to the flange 10. Then the rotating casing ring 1 is placed onto the flange attached to the drum. The rotary kiln is moved against the fixed input/output unit so that the work surfaces of the first casing ring and the rotating casing ring contacted and the hollows 82 and 81 in the casing rings form a lubricant channel 8. Thereafter with the use of fixing devices, the second casing ring 3 is attached to the flange 5 and in turn, the resulting nod is attached to the flange 10 of the fixed input/output unit 17. Hollows 91 and 93 over the second casing ring and rotating casing ring form a lubricant channel 9. Using fixing devices the casing rings are placed against one another, so that the end sealing assembly would turn hermetic and the gases produced in the rotary kiln during working would not escape into the surrounding environment. Lubricant is added through the filling channels of the lubricant channels 8, 9 and it is added while the rotary kiln is working, checking the temperature and quantity of the lubricant with sensors placed onto the end of the filling channels.

The end sealing of the rotary kiln according to present invention and the related innovative construction of the casing rings enabled to increase the working life of the end sealings between the service cycles up to 2.5 times, and simultaneously it decreased the time needed for replacing the end sealings by two times. The construction of the casing rings formed as segments enabled to decrease the expense of producing cast iron casing rings four times, which also reduced the transportation cost approximately three times. In addition, the reliability of the construction of the end sealings increased up to 2.5 times.

The invention claimed is:

1. An end sealing assembly of a rotary kiln that comprises:
a first flange attached to the outside of the end of a rotating drum of the rotary kiln and to which a rotating casing ring is attached, rotating with the rotating drum;
a second flange attached to the outside end of a fixed input/output unit of the rotary kiln and onto which a first fixed casing ring is attached and a second fixed casing ring is attached with fixing devices;

whereas the fixing devices include a spring, a fixing bolt and a fixed flange onto which the second fixed casing ring is attached, wherein the first fixed casing ring and the second fixed casing ring are both made out of at least four segments coupled together to arrange respectively the first fixed casing ring and the second fixed casing ring arranged on opposite circumferential sides of the rotating casing ring attached to the rotating drum whereas hollows for lubricant are onto both sides of the rotating casing ring; and correspondingly, a hollow with a trapezoidal cross section for lubricant is formed onto the side of the first fixed casing ring and the second casing ring to be assembled with while composing the rotating casing ring with the first and second casing ring; and such that when forming the end sealing assembly, a first lubricant channel is made out of the hollows between the rotating casing ring and the first fixed casing ring, and a second lubricant channel is made out of the hollows between the rotating casing ring and the second fixed casing ring.

2. The end sealing assembly of the rotary kiln according to claim 1, wherein the ratio of depth Dk of the hollow formed onto the one side of the first fixed casing ring to thickness T of said first fixed casing ring is between 0.15 to 0.6 and the ratio of depth of the hollow formed onto the one side of the second fixed casing ring to thickness T of said second fixed casing rings is between 0.15 to 0.6.

3. The end sealing assembly of the rotary kiln according to claim 1, wherein for the lubricant, which is added to the end sealing assembly while the rotary kiln is working, a first filling channel with a head from the outside of the first fixed casing ring to the first lubricant channel is formed in the first fixed casing ring and a second filling channel with a head from the outside of the second fixed casing ring to the second lubricant channel is formed in the second casing ring.

4. The end sealing assembly of the rotary kiln according to claim 3, wherein the sensors measuring the quantity and temperature of the added lubricant are placed onto the input end of the first filling channel and the second filling channel.

5. The end sealing assembly of the rotary kiln according to claim 1, wherein the hollows in the rotating casing ring, the first fixed casing ring and the second fixed casing ring have the trapezoidal cross section.

6. The end sealing assembly of the rotary kiln according to claim 1, wherein the first and second fixed casing ring are made of cast iron.

7. The end sealing assembly of the rotary kiln according to claim 1, wherein the rotating casing ring is made of steel.

8. The end sealing assembly of the rotary kiln according to claim 1, wherein the rotating casing ring is made out of at least two segments coupled together to arrange the rotating casing ring which is connected to the rotating drum.

9. The end sealing assembly of the rotary kiln according to claim 1, wherein the segments of the first fixed casing ring and second fixed casing ring have identical thickness and the first fixed casing ring and the second fixed casing ring as being respectively formed out of segments have an identical diameter.

10. The end sealing assembly of the rotary kiln according to claim 1, wherein between the rotating casing ring and the second flange, which is attached to the outside of the end of the rotary kiln input/output unit, a sealing is placed, the outer diameter of which is smaller than the inner diameter of the first fixed casing ring.

11. The end sealing assembly of the rotary kiln according to claim 2, wherein the hollows in the rotating casing ring, the first fixed casing ring and the second fixed casing ring have the trapezoidal cross section.

* * * * *